2,828,339
Patented Mar. 25, 1958

2,828,339

P,P'-SULFONYLDIBENZOIC ACID DERIVATIVES AND THEIR PREPARATION

John R. Caldwell and William R. Kingdon, Kingsport, Tenn., assignors to Eastman Kodak Company, Rochester, N. Y., a corporation of New Jersey No Drawing. Application October 27, 1953
Serial No. 388,664

4 Claims. (Cl. 260—558)

This invention relates to the preparation of new bifunctional materials useful in the preparation of mixed polymers and to the bifunctional materials prepared thereby and polymers thereof. More particularly the invention is concerned with the preparation of hydroxyalkyl amides of p,p'-sulfonyldibenzoic acid.

A large variety of mixed polymers, such as those prepared by reacting two bifunctional materials, are well known in the art. Typical of such polymers are the polyester-amides, and the polyamide urethanes. Such materials find utility for a large variety of applications. Thus, these and similar mixed polymers can be used to make films and sheets which are useful as film bases and support layers in the manufacture of photographic film or for use as inner layers in the preparation of laminated safety glass. The polymers can also be spun into fibers and used in the preparation of synthetic materials. In most cases, the polymers can also be extruded in the form of rods, tubes, and the like, or can be used in the conventional molding processes to form a variety of molded articles.

These mixed polymers depend for their formation on the use of bifunctional materials. Such materials have at least two functional groups which can be hydroxyl groups, amino groups, or carboxyl groups, or the like.

It is accordingly an object of this invention to provide certain new bifunctional materials useful in the preparation of mixed polymers.

It is another object of the invention to provide new hydroxyalkyl amides of an aromatic dicarboxylic acid prepared by a simple and straightforward process.

It is also an object of this invention to provide hydroxyalkyl amides of p,p'-sulfonyldibenzoic acid and mixed polymers thereof with dicarboxylic acids or diisocyanates or other well known bifunctional materials.

Another object of the invention is to provide new derivatives of p,p'-sulfonyldibenzoic acid.

Other objects will be apparent from the description and claims which follow.

These and other objects are accomplished by means of this invention as described in detail hereinafter with particular reference to certain preferred embodiments thereof. The bifunctional derivatives embodying this invention have the structure

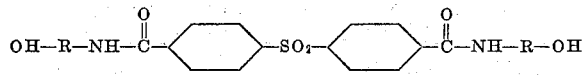

wherein OH—R is selected from the group consisting of hydroxyalkyl and hydroxyalkoxy alkyl radicals and the compound contains at least 18 and not more than 26 carbon atoms. The radical R can be either a straight or a branched chain alkyl radical containing from 2 to 6 carbon atoms and it can also contain an ether grouping as in the case of the alkoxy alkyl radicals.

These derivatives of p,p'-sulfonyldibenzoic acid are, for the most part, high melting crystalline solids. Because of the presence of the two hydroxy groups, these compounds are readily reacted with carboxylic acids such as adipic acid, sebacic acid, or the like or with $\alpha,\beta$-unsaturated dicarboxylic acids or their anhydrides such as maleic acid or its anhydride, itaconic acid or its anhydride, or the like to form mixed polyester-amides. Similarly, the dibenzoic acid derivatives embodying this invention can be heated with diisocyanates including the alkyl diisocyanates, such as ethyl diisocyanate, or the carbalkoxy isocyanates, such as the acetic acid isocyanate esters, or similar well-known isocyanate esters to give mixed polyamide-urethane polymers.

These and similar mixed polymers are prepared in accordance with the usual practice which involves heating a mixture of the interpolymerizable compounds at an elevated temperature, such as 150–250° C., for a time sufficient to effect the desired degree of polymerization. The polymerization can be effected in the dry state or in a suitable solvent medium as desired. The resulting mixed polymers can then be used directly in the preparation of films, sheets, extruded articles, molded articles, fibers, or the like, or they can be dissolved in a suitable solvent and the solution can be used for casting films or for the preparation of polymer threads by being ejected into a coagulant solution.

The compounds embodying this invention are prepared by heating at reacting temperature a hydroxy amine containing from 2 to 6 carbon atoms and a material capable of furnishing p,p'-sulfonyldibenzoic acid under the reaction conditions. The hydroxy amine can be either a hydroxyalkyl amine or a hydroxyalkoxy alkyl amine. Thus, for example, the hydroxy amine can be monoethanolamine, gamma-hydroxypropylamine, 5-hydroxyamyl amine or a branched chain hydroxyalkyl amine such as $\alpha,\alpha$-dimethyl-$\beta$-hydroxyethyl amine or $\beta,\beta$-dimethyl-gamma-hydroxypropylamine or similar straight or branched chain hydroxyalkyl amine. Similarly, the hydroxyalkyl amine can contain a chain ether group and typical of the materials of this kind which are suitably employed are $\beta$-hydroxyethoxypropyl amine, hydroxymethoxypropyl amine and similar hydroxyalkoxy alkyl amines.

These or other hydroxy amines as defined herein are then reacted with an ester or an acid chloride of p,p'-sulfonyldibenzoic acid or the salt of p,p'-sulfonyldibenzoic acid and the hydroxy amine can be prepared and then caused to react by means of heat. The esters of p,p'-sulfonyldibenzoic acid are desirably employed for best yields and to obtain products which are readily purified. Any of the well-known esters can be used, although the alkyl esters and particularly the lower alkyl esters such as the methyl, ethyl, propyl, or butyl esters are desirably employed for economic reasons. The reaction mixture is usually heated to a temperature of from 80° to 200° C. and preferably from 100° to 150° C. using an excess of hydroxy amine. If desired, the liberated alcohol can be distilled from the reaction vessel during the course of the reaction although this is not necessary for good results.

The compounds embodying this invention can also be formed by heating an acid chloride of p,p'-sulfonyldibenzoic acid with the hydroxy amine in the presence of a basic material such as an alkali or other acid-acceptor. If desired the hydroxy amine and p,p'-sulfonyldibenzoic acid can merely be mixed in a suitable solvent to form the salt and this salt can then be recovered and heated at a temperature of 120–180° C. in the presence of an acid catalyst to give a derivative embodying this invention.

The product is readily purified by being recrystallized from a suitable solvent. The product is soluble in hot alcohol and hot dioxane and in some cases soluble in hot water. For the most part, the products embodying the invention tend to be insoluble in benzene.

The invention is illustrated by the following examples of certain preferred embodiments thereof which are not intended to limit the scope of the invention unless otherwise specifically indicated.

Example 1

A mixture of 124 g. (0.3 mole) of p,p'-sulfonyldibenzoic acid dibutyl ester and 48.8 g. (0.8 mole) of monoethanolamine was heated to about 140–160° C. in a flask equipped with a reflux condenser. The butyl alcohol liberated in the course of the reaction began to reflux and the mixture was heated under total reflux for six hours. After cooling, the product crystallized; and it was purified by being heated at 100° C. to remove the butyl alcohol and then by being recrystallized twice from hot water. The product was then recrystallized from methanol in a yield of 80–90% of material melting at 207–208° C. Analysis of the product showed 7.14% nitrogen which agreed exactly with the theoretical amount. A mixed polymer is readily prepared by heating this product with a dicarboxylic acid such as adipic acid in accordance with the usual procedure.

In preparing the dibenzoic acid derivatives, the hydroxy amine is desirably employed in at least 10 to 25% excess over the theoretical amount required to react with the p,p'-sulfonyldibenzoic acid. In many cases it is desirable to employ from 2 to 3 molar proportions of the hydroxy amine for each molar proportion of the dibenzoic acid derivative. Lesser amounts can be used depending upon the degree of interpolymerization desired and greater amount can be employed in some cases although they are usually not necessary for optimum results.

Example 2

Into a flask equipped with a fractionating column were charged 95 g. (0.31 mole) of p,p'-sulfonyldibenzoic acid dimethyl ester and 53 g. (0.72 mole) of gamma-hydroxypropyl amine. This was then dissolved in 200 cc. of diethylene glycol diethyl ether and the resulting mixture was heated at 150° C. until the distillation of methyl alcohol practically ceased. The solvent was removed under vacuum at 100–170° C. and the crystalline product thereby obtained was dissolved in hot water, filtered, and cooled. The crystals which separated out were recrystallized successively from hot water and from isopropyl alcohol to give N,N'-di(gamma-hydroxypropyl) amide of p,p'-sulfonyldibenzoic acid melting at 188–188.5° C. and in a yield of 75–80%. The actual nitrogen content of the product was 6.69% as compared to the theoretical amount of 6.76%.

Example 3

N,N'-di(5-hydroxyamyl) amide of p,p'-sulfonyldibenzoic acid was prepared by heating 1 molar proportion of p,p'-sulfonyldibenzoic acid diethyl ester with 2,2 molar proportions of 5-hydroxy amine as described in the preceding example. The product, after being recrystallized three times from ethyl alcohol, melted at 185° C. The actual nitrogen content was 5.68% as compared to the theoretical content of 5.88%.

Example 4

One mole proportion of p,p'-sulfonyldibenzoic dibutyl ester was heated for 6 hours under total reflux with 2.3 mole proportions of β-hydroxy ethoxy propyl amine, $H_2N(CH_2)_3-O-(CH_2)_2OH$. The product, after being recrystallized three times from ethyl acetate, melted at 135° C. The actual nitrogen content of 5.50% compared to 5.52% theoretical.

Example 5

One mole proportion of p,p'-sulfonyldibenzoic acid dibutyl ester was heated for 6 hours at 150–160° C. with 2.5 mole proportions of α,α-dimethyl-β-hydroxy ethyl amine. The product was recrystallized three times from aqueous isopropyl alcohol. The product had a melting point of 260–261° C. and contained 6.15% nitrogen as compared to a theoretical content of 6.3%.

Example 6

One mole proportion of p,p'-sulfonyldibenzoic acid dibutyl ester was heated under reflux at 150–160° C. for 6 hours with 2.4 mole proportions of β,β-dimethyl-gamma-hydroxy propyl amine. The N,N'-di(β,β-dimethyl-gamma-hydroxy propyl) amide of p,p'-sulfonyldibenzoic acid thus obtained was recrystallized from a mixture of isopropyl alcohol and water. The product melted at 208–209° C. and contained 5.89% nitrogen as compared to 5.89% theoretical. The compound had the structure

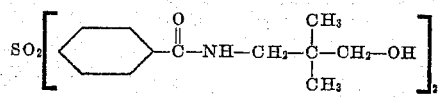

Other similar derivatives are prepared with other hydroxy amines as defined hereinabove with these and other esters of p,p'-sulfonyldibenzoic acid or with the corresponding acid chloride or by forming a salt of the acid and the amine. Any of these materials thus obtained can be used as a bifunctional material in the preparation of mixed polymers. The bifunctional materials themselves as well as the mixed polymers prepared therefrom can be obtained by any of the well known techniques used in chemical practice including both batchwise and continuous processes. The conditions under which the sulfonyldibenzoic acid derivatives or the polymers thereof are formed can be varied in accordance with the usual practice since the reaction conditions are not particularly critical.

Although the invention has been described in detail with reference to certain preferred embodiments thereof, it will be understood that variations and modifications can be effected within the spirit and scope of the invention as described hereinabove and as defined in the appended claims.

We claim:

1. A monomeric compound containing at least 18 and not more than 26 carbon atoms and having the formula:

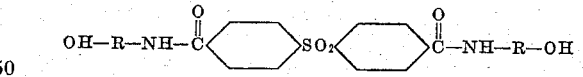

wherein OH—R is selected from the group consisting of hydroxyalkyl and hydroxyalkoxy alkyl radicals.

2. Monomeric N,N'-di(hydroxyalkyl) amide of p,p'-sulfonyldibenzoic acid containing from 18 to 26 carbon atoms.

3. Monomeric N,N'-di(hydroxyalkoxy alkyl) amide of p,p'-sulfonyldibenzoic acid containing from 18 to 26 carbon atoms.

4. Monomeric N,N'-di(dimethyl-hydroxy alkyl) amide of p,p'-sulfonyldibenzoic acid containing from 18 to 26 carbon atoms.

References Cited in the file of this patent

UNITED STATES PATENTS

| | | |
|---|---|---|
| 2,547,113 | Drewitt et al. | Apr. 3, 1951 |
| 2,552,321 | Jayne et al. | May 8, 1951 |
| 2,614,120 | Caldwell | Oct. 14, 1952 |

OTHER REFERENCES

Meyer: Annalen der Chemie, vol. 433, pp. 327, 338, 339 (1923).